United States Patent
Gomi et al.

(10) Patent No.: US 12,105,069 B2
(45) Date of Patent: Oct. 1, 2024

(54) LIQUID SENDING SYSTEM FOR LIQUID CHROMATOGRAPH

(71) Applicant: SHIMADZU CORPORATION, Kyoto (JP)

(72) Inventors: Tomohiro Gomi, Kyoto (JP); Daisuke Kitabayashi, Kyoto (JP); Shinya Imamura, Kyoto (JP); Keisuke Ogawa, Kyoto (JP); Masataka Nikko, Kyoto (JP); Masahide Gunji, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 536 days.

(21) Appl. No.: 17/438,421

(22) PCT Filed: Oct. 16, 2019

(86) PCT No.: PCT/JP2019/040649
§ 371 (c)(1),
(2) Date: Sep. 11, 2021

(87) PCT Pub. No.: WO2020/183774
PCT Pub. Date: Sep. 17, 2020

(65) Prior Publication Data
US 2022/0128533 A1    Apr. 28, 2022

(30) Foreign Application Priority Data
Mar. 13, 2019    (JP) .................. 2019-045544

(51) Int. Cl.
*G01N 30/86*    (2006.01)
*G01N 30/02*    (2006.01)
*G01N 30/32*    (2006.01)

(52) U.S. Cl.
CPC ......... *G01N 30/8658* (2013.01); *G01N 30/32* (2013.01); *G01N 2030/027* (2013.01)

(58) Field of Classification Search
CPC ............... G01N 30/8658; G01N 30/32; G01N 2030/027
See application file for complete search history.

(56) References Cited

U.S. PATENT DOCUMENTS 4,448,692 A      5/1984   Nakamoto et al.
2005/0147508 A1  7/2005   Luongo et al.
(Continued)

FOREIGN PATENT DOCUMENTS

EP    0106009 A1     4/1984
JP    60-011690 A    1/1985
(Continued)

OTHER PUBLICATIONS

Machine translation of JP 2000-130353.*
(Continued)

*Primary Examiner* — Benjamin L Lebron
(74) *Attorney, Agent, or Firm* — Renner, Otto, Boisselle & Sklar, LLP

(57) ABSTRACT

A liquid sending failure detector acquires periodically a liquid sending pressure of a liquid sending mechanism consecutively sends liquid using at least one plunger pump that sends liquid by reciprocally driving a plunger such that a fluctuation is read in one driving period of the liquid sending mechanism, and detect a liquid sending failure of the liquid sending mechanism using an acquired liquid sending pressure. The liquid sending failure detector executes a pulsation detection step of obtaining a fluctuation range of the liquid sending pressure in a certain driving period of the liquid sending mechanism and detecting pulsation on a condition that a count of consecutive periods in (Continued)

which the fluctuation range exceeds a predetermined reference value exceeds a predetermined reference count, and a liquid sending failure detection step of detecting a liquid sending failure of the liquid sending mechanism when the pulsation is detected in the pulsation detection step.

9 Claims, 3 Drawing Sheets

(56) References Cited

U.S. PATENT DOCUMENTS

| | | | |
|---|---|---|---|
| 2008/0245136 A1 | 10/2008 | Gerhardt et al. | |
| 2013/0064683 A1 | 3/2013 | Oshima et al. | |
| 2014/0299542 A1* | 10/2014 | Song | G01M 3/2815 210/635 |
| 2016/0153942 A1 | 6/2016 | Yotani et al. | |
| 2019/0211813 A1 | 7/2019 | Yanagibayashi et al. | |

FOREIGN PATENT DOCUMENTS

| | | |
|---|---|---|
| JP | 11-326300 A | 11/1999 |
| JP | 2000-130353 A | 5/2000 |
| JP | 2001-147222 A | 5/2001 |
| JP | 2004-524518 A | 8/2004 |
| WO | 02/053255 A1 | 7/2002 |
| WO | 2018/055866 A1 | 3/2018 |

OTHER PUBLICATIONS

Office Action for co-pending U.S. Appl. No. 17/438,419 dated Nov. 6, 2023.
Office Action for co-pending U.S. Appl. No. 17/438,076 dated Nov. 6, 2023.
International Search Report for corresponding Application No. PCT/JP2019/040649, mailed Jan. 7, 2020.
Written Opinion for corresponding Application No. PCT/JP2019/040649, mailed Jan. 7, 2020 (English machine translation).
Co-pending U.S. Appl. No. 17/438,076, filed Sep. 10, 2021.
Co-pending U.S. Appl. No. 17/438,418, filed Sep. 11, 2021.
Co-pending U.S. Appl. No. 17/438,419, filed Sep. 11, 2021.
Notice of Reasons for Refusal for corresponding Japanese Patent Application No. 2021-505495 dated Jul. 5, 2022, with English language machine translation.
Notice of Reasons for Refusal for corresponding Japanese Patent Application No. 2021-504700 dated Jul. 5, 2022, with English language machine translation.
Office Action for related Chinese Patent Application No. 201980093712.3 dated Jul. 17, 2023, with English language machine translation.
Office Action for co-pending U.S. Appl. No. 17/438,418 dated Aug. 17, 2023.
Notice of Allowance for co-pending U.S. Appl. No. 17/438,418 dated Jan. 8, 2024.
Office Action in corresponding Chinese Patent Application No. 201980093792.2 dated Dec. 18, 2023, with English machine translation.
Notice of Reasons for Refusal for corresponding Japanese Patent Application No. 2021-504712 dated Jul. 26, 2022, with English language machine translation.
Office Action in related Chinese Patent Application No. 201980093792.2 dated Jun. 29, 2023, with English machine translation.

* cited by examiner

LIQUID SENDING SYSTEM FOR LIQUID CHROMATOGRAPH

TECHNICAL FIELD

The present invention relates to a liquid sending system for sending a mobile phase consecutively in a liquid chromatographic system.

BACKGROUND ART

It is required that a liquid sending system for a liquid chromatograph has an ability to stably send a solvent which is a mobile phase at a set flow rate. As a liquid sending mechanism of a liquid sending system, mechanisms of a single plunger system including a single plunger pump or a double plunger system including two plunger pumps are employed.

When a plunger pump discharges a solvent, a periodically large fluctuation of liquid sending pressure that is so-called pulsation may occur when a liquid sending pressure decreases due to compression of solvent, entrapment of fine bubbles in a flow path, leakage of liquid from a check valve, shortage of solvent, etc. When pulsation occurs, the flow rate of a mobile phase is disrupted, and a result of analysis is negatively affected. This is a loss for a user. Therefore, measures have been taken to discharge bubbles in the flow path to outside by control of an operation of a plunger pump for suppression of pulsation (see Patent Document 1), removal of bubbles by use of a degassing unit or sending of a solvent at a high flow rate before an analysis is started, etc.

CITATION LIST

Patent Document

[Patent Document 1] JP 2001-147222 A

SUMMARY OF INVENTION

Technical Problem

Even with above-mentioned measures being taken, due to reasons such as a gas component that remained in a solvent becoming bubbles in a plunger pump or bubbles being generated when dissolved oxygen in a solvent was saturated due to a change in temperature, bubbles were entrapped in the plunger pump that was sending liquid, and an analysis continued. In such a case, the user continues to wastefully acquire analysis data.

The present invention was conceived considering the above-mentioned problems, and an object of the present invention is to provide a liquid sending system that includes a function of detecting a liquid sending failure caused by generation of bubbles when the liquid sending system is sending liquid.

Solution to Problem

A liquid sending system according to the present invention is a liquid sending system for a liquid chromatograph that includes a liquid sending mechanism configured to consecutively send liquid using at least one plunger pump that sends liquid by reciprocally driving a plunger, a pressure sensor for detecting a liquid sending pressure applied by the liquid sending mechanism, and a liquid sending failure detector configured to acquire a liquid sending pressure detected by the pressure sensor periodically such that a fluctuation is read in one driving period of the liquid sending mechanism, and detect a liquid sending failure of the liquid sending mechanism using an acquired liquid sending pressure, wherein the liquid sending failure detector is configured to execute a pulsation detection step of obtaining a fluctuation range of the liquid sending pressure in a certain driving period of the liquid sending mechanism and detecting pulsation on a condition that a count of consecutive periods in which the fluctuation range exceeds a predetermined reference value exceeds a predetermined reference count, and a liquid sending failure detection step of detecting a liquid sending failure of the liquid sending mechanism when the pulsation is detected in the pulsation detection step.

Here, in the present invention, "a fluctuation range of the liquid sending pressure in a certain driving period of the liquid sending mechanism" may be a fluctuation range of the liquid sending pressure in one driving period of the liquid sending mechanism. However, "a fluctuation range of the liquid sending pressure in a certain driving period of the liquid sending mechanism" may be a fluctuation range of the liquid sending pressure in a plurality of driving periods in the liquid sending mechanism or an average value of a fluctuation range of the liquid sending pressure in a plurality of driving periods of the liquid sending mechanism.

When bubbles are entrapped in a plunger pump, a liquid sending pressure decreases rapidly because liquid is not discharged until compression of entrapped bubbles is completed, and the liquid sending pressure increases after compression of bubbles is completed. Thus, a fluctuation of liquid sending pressure that is synchronized with driving of the plunger pump occurs periodically. Therefore, whether bubbles are entrapped in the plunger pump can be detected based on presence or absence of a fluctuation of liquid sending pressure that is synchronized with a driving period of the plunger pump.

Advantageous Effects of Invention

The liquid sending system of the present invention is configured to obtain a fluctuation range of liquid sending pressure in a certain driving period of a liquid sending mechanism, detect pulsation on a condition that the number of consecutive periods in which the fluctuation range exceeds a predetermined reference value exceeds a predetermined reference count, and detect a liquid sending failure in the liquid sending mechanism when detecting pulsation. Thus, the liquid sending system that includes a function of detecting a liquid sending failure caused by generation of bubbles when the liquid sending system is sending liquid is provided.

DESCRIPTION OF EMBODIMENTS

One inventive example of a liquid sending system according to the present invention will be described below with reference to the drawings.

Figure 1:
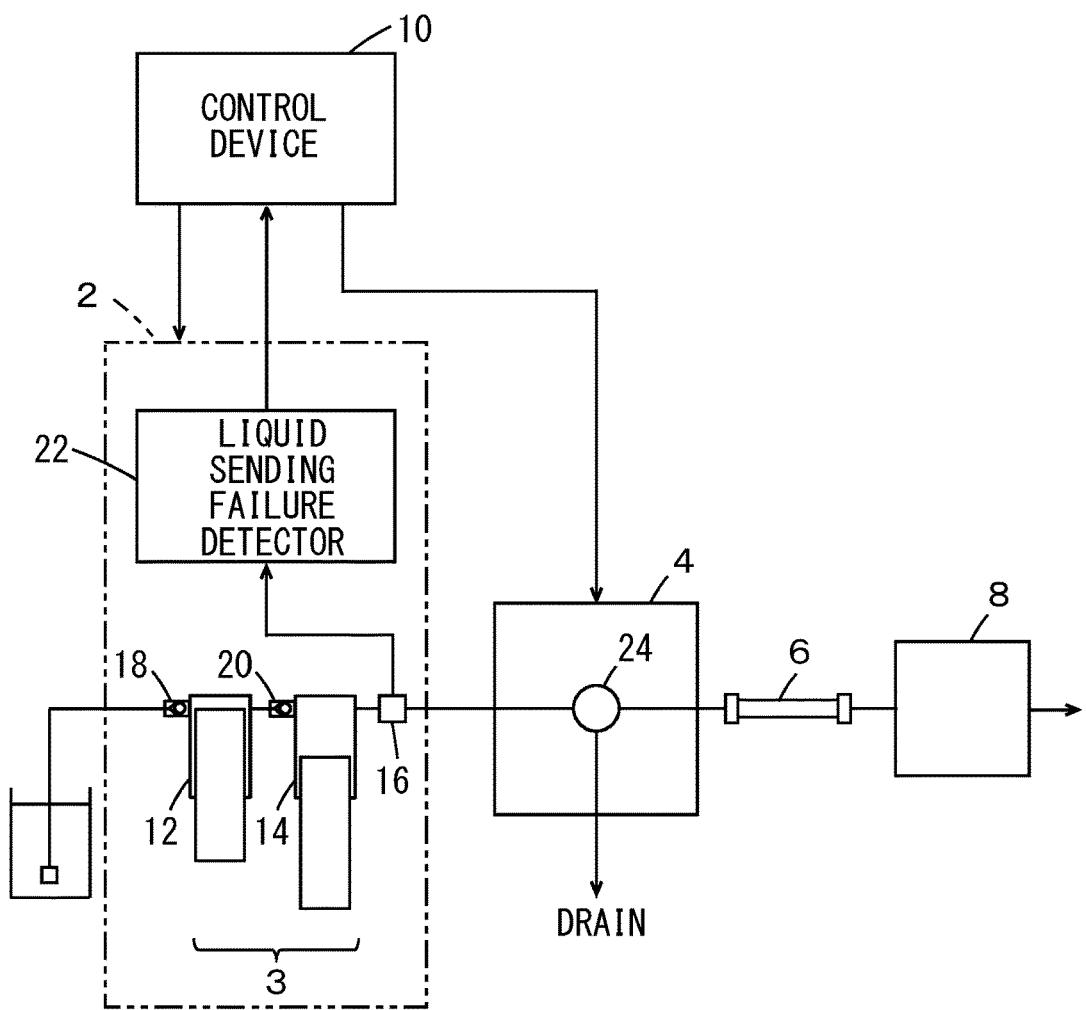
FIG. 1 A schematic diagram of the configuration of a liquid chromatograph showing one inventive example of a liquid sending system for a liquid chromatograph.

As shown in FIG. 1, a liquid chromatograph includes a liquid sending system 2, a sample injector 4, a separation column 6, a detector 8 and a control device 10.

The liquid sending system 2 of the inventive example includes a liquid sending mechanism 3 of a series double plunger system that is constituted by two plunger pumps including a plunger pump 12 (a first plunger pump) and a plunger pump 14 (a second plunger pump) that are connected to each other in series, and a pressure sensor 16 for detecting a liquid sending pressure applied by the liquid sending mechanism 3. A check valve 18 is provided at an inlet port of the front plunger pump 12, and a check valve 20 is provided between an outlet port of the front plunger pump 12 and an inlet port of the rear plunger pump 14. The plunger pumps 12, 14 are configured to operate complementarily with each other to stably send liquid. Specifically, the plunger pump 14 performs a sucking operation when the plunger pump 12 is performing a discharging operation, and the plunger pump 14 performs a discharging operation when the plunger pump 12 is performing a sucking operation.

The liquid sending system 2 further includes a liquid sending failure detector 22. The liquid sending failure detector 22 is a function obtained by execution of a predetermined program in an electronic circuit that partially constitutes the liquid sending system 2. The liquid sending failure detector 22 is configured to read a liquid sending pressure detected by the pressure sensor 16 and detect a liquid sending failure in the liquid sending mechanism 3 due to a fluctuation of liquid sending pressure, specifically, a liquid sending failure caused by entrapment of bubbles in the plunger pump 12 or 14. The liquid sending failure detector 22 can be provided as a function of the control device 10. Details of detection of a liquid sending failure will be described below.

The sample injector 4 is connected to a position farther downstream than the liquid sending mechanism 3. The sample injector 4 is to inject a sample into a mobile phase that is sent by the liquid sending mechanism 3. In the inventive example, the sample injector 4 includes a switch valve 24, and is configured to be capable of switching between guiding a mobile phase from the liquid sending system 2 to the separation column 6 and discharging the mobile phase to a drain by switching the switch valve 24. A switch valve for switching between guiding a mobile phase from the liquid sending system 2 to the separation column 6 and discharging the mobile phase to the drain is not necessarily required to be provided in the sample injector 4 and may be provided separately from the sample injector 4. Further, such a switch valve is not necessarily required to be provided in order to detect a liquid sending failure.

The separation column 6 is connected to a position farther downstream than the sample injector 4, and the detector 8 is connected to a position farther downstream than the separation column 6. The separation column 6 is to separate a sample that has been injected into a mobile phase by the sample injector 4 into components, and sample components obtained by separation in the separation column 6 are detected by the detector 8.

The control device 10 is to manage at least the operations of the liquid sending system 2 and the sample injector 4, and is realized by a system controller and/or a general personal computer dedicated to the liquid chromatograph, for example. In a case where the liquid sending failure detector 22 of the liquid sending system 2 detects a liquid sending failure in the liquid sending mechanism constituted by the plunger pumps 12, 14, a signal indicating detection of a liquid sending failure is transmitted to the control device 10. In this case, when it is set in advance that the plunger pumps 12, 14 perform a purge operation for resolving a liquid sending failure, the control device 10 transmits an instruction for switching the switch valve 24 to the sample injector 4 such that a mobile phase is guided to the drain, and transmits an instruction for increasing a liquid sending flow rate to a predetermined high flow rate to the liquid sending system 2. Thus, bubbles in the plunger pumps 12, 14 are discharged to the drain.

Here, a fluctuation of liquid sending pressure that occurs when bubbles are entrapped in the plunger pump 12 or 14 will be described with reference to FIG. 2.

Figure 2:
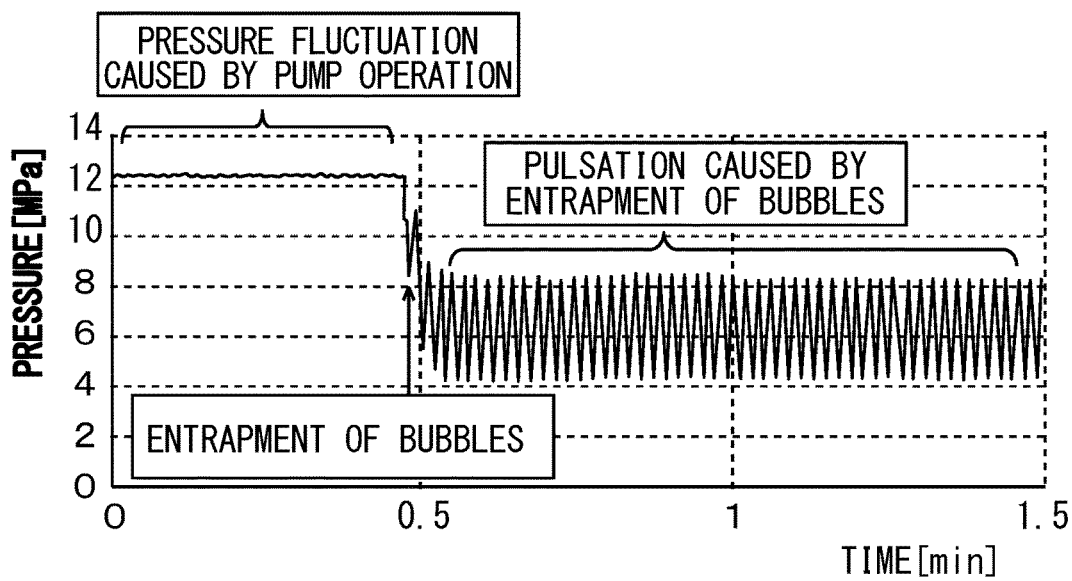
FIG. 2 One example of a waveform of liquid sending pressure when bubbles are generated in a plunger pump.

As shown in the left part of a pressure waveform of FIG. 2, when a mobile phase can be sent stably, although a subtle pressure fluctuation caused by an operation of the plunger pumps 12, 14, or the like can be seen, the liquid sending pressure is stable. In a case where bubbles are entrapped in one of the plunger pumps 12, 14, when the one plunger pump 12 or 14 in which bubbles are entrapped performs a discharging operation, a liquid sending pressure decreases rapidly because liquid is not discharged normally due to compression of generated bubbles. When the other plunger pump 14 or 12 performs a discharging operation, a liquid sending pressure increases because liquid is discharged normally. As a result, as shown in the right part of the pressure waveform of FIG. 2, a fluctuation (pulsation) of liquid sending pressure that is synchronized with a driving period of the liquid sending mechanism 3 occurs. Therefore, the liquid sending failure detector 22 is configured to detect a liquid sending failure by detecting pulsation.

Here, a period of pulsation caused by entrapment of bubbles in the plunger pump 12 or 14 is synchronized with a driving period of the liquid sending mechanism 3 constituted by the plunger pump 12 or 14. Therefore, in order to detect pulsation, it is necessary to acquire a signal of the pressure sensor 16 frequently enough to read a fluctuation of liquid sending pressure in the driving period of the liquid sending mechanism 3. Therefore, the frequency of acquisition of a signal by the liquid sending failure detector 22 from the pressure sensor 16 may be adjusted in accordance with a driving speed of the plunger pump 12 or 14. In this case, a reading period of a signal from the pressure sensor 16 can be determined by calculation when a liquid sending flow rate is determined.

One example of algorithm of pulsation detection by the liquid sending failure detector 22 will be described with reference to the flowchart of FIG. 3.

Figure 3:
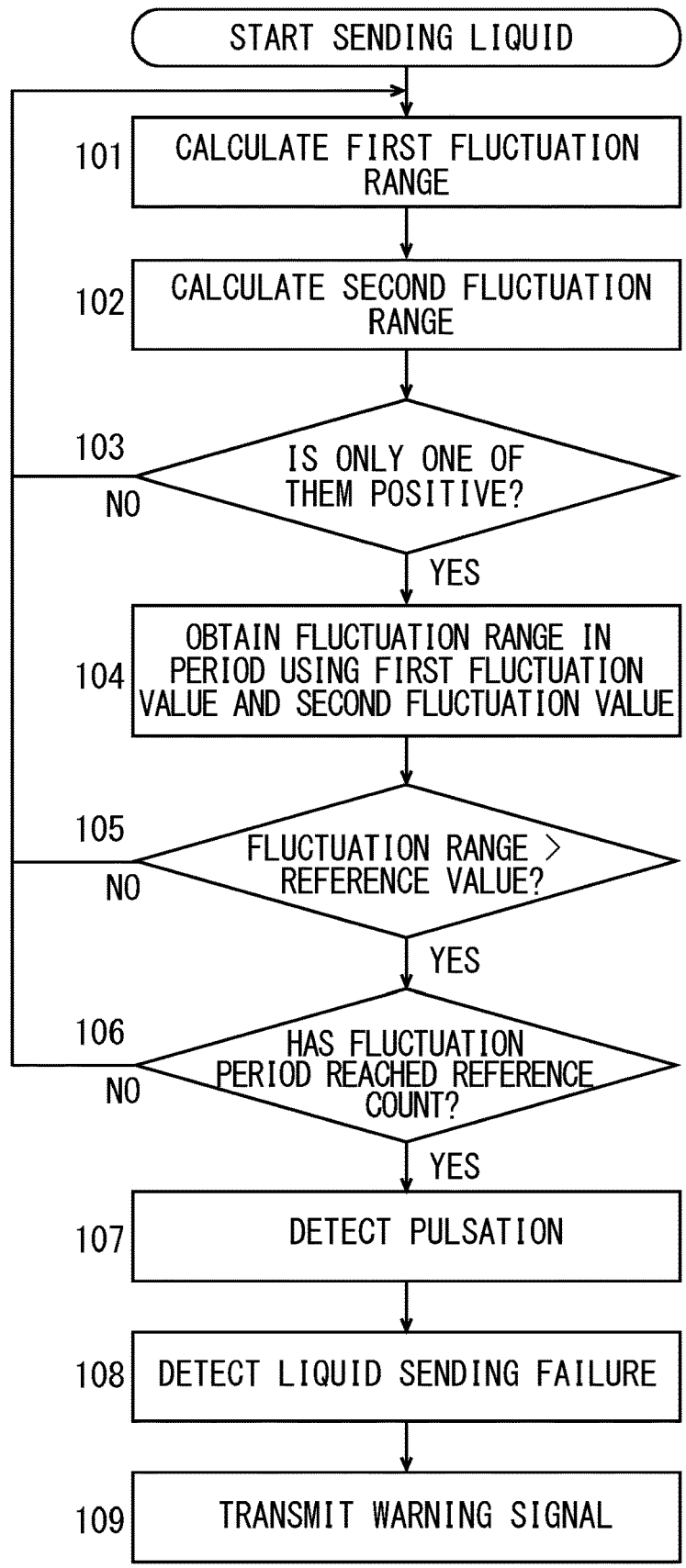
FIG. 3 A flowchart showing an operation of detecting a liquid sending failure in the same inventive example.

The example of FIG. 3 is effective in a case where a fluctuation of liquid sending pressure in one driving period of the liquid sending mechanism 3 can be read in several tens of segments. In a case where the liquid sending pressure can be read highly frequently, liquid sending pressures at a start point and an end point of a discharging operation of the plunger pump 12 and liquid sending pressures at a start point and an end point of a discharging operation of the plunger pump 14 can be read accurately. Here, one driving period of the liquid sending mechanism 3 refers to a period from a point in time at which a discharging operation of one plunger pump 12 or 14 of the plunger pumps 12, 14 is started to a point in time at which a discharging operation of the other plunger pump 14 or 12 of the plunger pumps 12, 14 ends.

When the liquid sending mechanism 3 starts sending liquid, the liquid sending failure detector 22 acquires a signal of the pressure sensor 16 at predetermined frequency and reads a liquid sending pressure (moving average value). When reading liquid sending pressures at a start point and an end point of a discharging operation of one plunger pump 12 or 14 of the plunger pumps 12, 14, the liquid sending failure detector 22 obtains the difference (the liquid sending pressure at the start point minus the liquid sending pressure at the end point) as a first fluctuation value (step 101). When reading liquid sending pressures at a start point and an end point of a discharging operation of the other plunger pump 14 or 12 of the plunger pumps 12, 14, the liquid sending failure detector 22 obtains the difference (the liquid sending pressure at the start point minus the liquid sending pressure at the end point as a second fluctuation value (step 102). In a case where bubbles are entrapped in one of the plunger pumps 12, 14, a liquid sending pressure decreases when one plunger pump 12 or 14 in which bubbles are entrapped is performing a discharging operation, and the liquid sending pressure increases when the other plunger pump 14 or 12 in which bubbles are not entrapped is performing a discharging operation. Therefore, in a case where a liquid sending failure caused by entrapment of bubbles has occurred in the liquid sending mechanism 3, only one of the first fluctuation value and the second fluctuation value is a positive value (the other value is a negative value). Therefore, in a case where the signs of a first fluctuation value and a second fluctuation value are the same, it can be determined that pulsation is not caused by entrapment of bubbles (step 103).

In a case where only one of a first fluctuation value and a second fluctuation value is a positive value, the liquid sending failure detector 22 obtains a fluctuation range of liquid sending pressure in one driving period of the liquid sending mechanism 3 using the first fluctuation value and the second fluctuation value (step 104). The fluctuation range of liquid sending pressure can be obtained by a following formula, for example.

A fluctuation range=|a first fluctuation value–a second fluctuation value|/2

The above-mentioned formula is one example, and the fluctuation range may be obtained using a formula such as A fluctuation range=|a first fluctuation value–a second fluctuation value| or

A fluctuation range=(a first fluctuation value–a second fluctuation value)$^2$

The liquid sending failure detector 22 compares the above-mentioned fluctuation values with a predetermined reference value. In a case where a fluctuation value exceeds the reference value, the liquid sending failure detector 22 counts the number of consecutive driving periods (fluctuation periods) in which the fluctuation value exceeds the reference value. Then, when the number of consecutive fluctuation periods reaches a predetermined reference count (step 105), pulsation is detected (steps 106, 107). When pulsation is detected, the liquid sending failure detector 22 detects a liquid sending failure in the liquid sending mechanism 3 (step 108), and transmits a warning signal to the control device 10 (step 109).

Here, a fluctuation range ΔP of liquid sending pressure caused by bubbles entrapped in the plunger pump 12 or 14 is determined by a time constant τ of the liquid chromatograph. A time constant τ is a value that depends on an entire liquid sending pressure P[MPa], a damper C[uL/MPa] and a liquid sending flow rate Q[mL/min]. A damper C[uL/MPa] is a value that depends on an internal volume V[uL] of each module or a pipe that constitutes the liquid chromatograph and a compression rate β[GPa$^{-1}$] of a mobile phase. For example, in a case where a length of time that has elapsed since bubbles are entrapped in the plunger pump 12 or 14 is t seconds, it is considered that the fluctuation range ΔP of liquid sending pressure is determined by a following formula.

$$\Delta P \propto e^{-\frac{t}{\tau}} = f(P, C, Q, t)$$

Therefore, a reference value for detection of pulsation caused by entrapment of bubbles in the plunger pump 12 or 14 can be determined by calculation in consideration of ΔP obtained by the above-mentioned formula.

Each time reading a liquid sending pressure, the liquid sending failure detector 22 can calculate a reference value using the above-mentioned algorithm to use the reference value for detection of pulsation. However, some of arguments P, C, Q, t (or P, V, β, Q, t) of the above-mentioned formula may be not used, and a reference value may be determined more simply. For example, ΔP that is obtained when only P, C are taken as arguments and other elements are taken as fixed values may be used as a reference. A reference value is not necessarily required to be determined by calculation and may be a preset fixed value.

Further, the reference count for the number of consecutive fluctuation periods for determination of pulsation may be adjusted variably. In this case, the reference count can be adjusted in accordance with the degree of sensitivity of pulsation detection.

The algorithm for pulsation detection is not limited to the above-mentioned algorithm. For example, it is possible to detect pulsation by monitoring a liquid sending pressure in each driving period of the liquid sending mechanism 3, obtaining a fluctuation range of liquid sending pressure in one driving period and comparing the fluctuation range with a reference value determined as described above.

Figure 4:
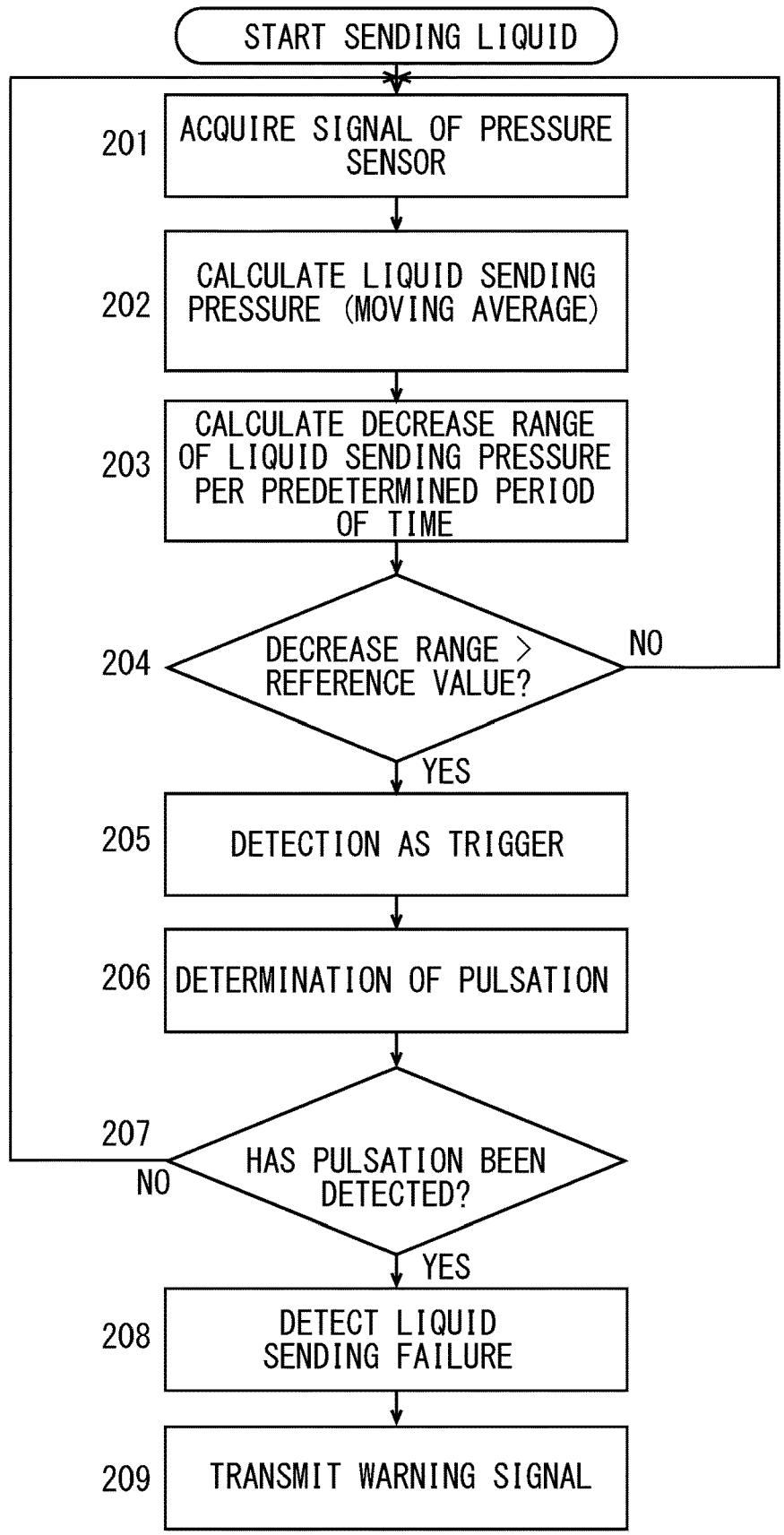
FIG. 4 A flowchart for explaining one example of algorithm for detection of trigger.

The above-mentioned algorithm is effective in a case where liquid sending pressures at a start point and an end point of a discharging operation of the plunger pumps 12, 14 cannot be accurately read. However, with the algorithm, because whether a liquid sending pressure has decreased or increased in one driving period of the liquid sending mechanism 3 cannot be judged, whether a pressure fluctuation is caused by entrapment of bubbles in one plunger 12 or 14 cannot be certainly determined. As such, before the algorithm for pulsation detection is executed, algorithm for detection of a trigger as explained in the flowchart of FIG. 4 may be introduced.

When the liquid sending mechanism 3 starts sending liquid, the liquid sending failure detector 22 reads a signal of the pressure sensor 16 in a predetermined period (step 201) and calculates a liquid sending pressure (moving average value) (step 202). The liquid sending failure detector 22 calculates a decrease range of liquid sending pressure per length of time (a length of time in which a signal is read ten times, for example) that is set based on a driving period of the liquid sending mechanism 3 (step 203). Then, the calculated decrease range is compared with a predetermined reference range (step 204). When the decrease range exceeds the reference value, it is detected as a trigger for an occurrence of pulsation (step 205).

After detecting a trigger, the liquid sending failure detector 22 detects pulsation using the above-mentioned algorithm for pulsation detection (step 206). In a case where pulsation is detected, the liquid sending failure detector 22 detects a liquid sending failure (steps 207, 208) and transmits a warning signal to the control device 10 (step 209). In a case where pulsation is not detected, the process returns to the above-mentioned step 201 (step 207).

Here, a coefficient to be used for determination of each of a reading period of a signal from the pressure sensor 16 and a reference value for pulsation detection by calculation may be adjusted variably based on a user's input of a change instruction or user's actual evaluation in regard to a result of detection of liquid sending failure. Further, in a case where the analysis system of the liquid chromatograph is connected to a common database shared with an analysis system of another liquid chromatograph through a network line such as an internet line, a coefficient to be used for determination of a reading period or a reference value based on user's evaluation accumulated in the database in regard to a result of detection of liquid sending failure may be automatically adjusted.

While the liquid sending system 2 including the liquid sending mechanism 3 of a series double plunger system is described with examples in the above-described inventive example, the present invention is not limited to this. The present invention can be similarly applied to a liquid sending mechanism in which a pressure fluctuation that is caused by entrapment of bubbles and synchronized with a driving period of a plunger pump occurs, that is, a liquid sending system including a liquid sending mechanism of a parallel double plunger system or a liquid sending mechanism of a single plunger system. That is, the above-mentioned inventive example is merely one example of embodiments of the liquid sending system according to the present invention. The embodiments of the liquid sending system according to the present invention are as described below.

An embodiment of a liquid sending system according to the present invention is a liquid sending system for a liquid chromatograph that includes a liquid sending mechanism configured to consecutively send liquid using at least one plunger pump that sends liquid by reciprocally driving a plunger, a pressure sensor for detecting a liquid sending pressure applied by the liquid sending mechanism, and a liquid sending failure detector configured to acquire a liquid sending pressure detected by the pressure sensor periodically such that a fluctuation is read in one driving period of the liquid sending mechanism, and detect a liquid sending failure of the liquid sending mechanism using an acquired liquid sending pressure, wherein the liquid sending failure detector is configured to execute a pulsation detection step of obtaining a fluctuation range of the liquid sending pressure in a certain driving period of the liquid sending mechanism and detecting pulsation on a condition that a count of consecutive periods in which the fluctuation range exceeds a predetermined reference value exceeds a predetermined reference count, and a liquid sending failure detection step of detecting a liquid sending failure of the liquid sending mechanism when the pulsation is detected in the pulsation detection step.

A first aspect of the embodiment of the liquid sending system according to the present invention, the liquid sending mechanism includes a first plunger pump and a second plunger pump that are driven complementarily, and the liquid sending failure detector is configured to obtain a difference between the liquid sending pressures at a start point and an end point of a discharging operation of the first plunger pump as a first fluctuation value, obtain a difference between the liquid sending pressures at a start point and an end point of a discharging operation of the second plunger pump as a second fluctuation value, and obtain the fluctuation range using the first fluctuation value and the second fluctuation value.

In the above-mentioned first aspect, the liquid sending failure detector may be configured to count only a period in which only one of the first fluctuation value and the second fluctuation value is a positive value as a period in which the fluctuation range exceeds a predetermined reference value, in the pulsation detection step. In this case, pulsation caused by entrapment of bubbles in the first plunger pump or the second plunger pump can be accurately detected.

In a second aspect of the embodiment of the liquid sending system according to the present invention, the reference count is variable. The reference count is variable, so that sensitivity of pulsation detection is adjustable. The second aspect can be combined with the above-mentioned first aspect.

In a third aspect of the embodiment of the liquid sending system according to the present invention, the liquid sending failure detector is configured to execute a reference value determination step of determining the reference value by calculation based on at least the liquid sending pressure, before the pulsation detection step. With such an aspect, pulsation can be detected more highly accurately. The third aspect can be combined with the above-mentioned first aspect and/or the second aspect.

In the above-mentioned third aspect, a coefficient to be used for calculation of the reference value in the reference value determination step may be variable. In this case, the reference value for pulsation detection is adjustable to a more suitable value.

In a fourth aspect of the embodiment of the liquid sending system according to the present invention, the liquid sending failure detector, before the pulsation detection step, is configured to execute a pressure decrease calculation step of calculating a decrease range of a liquid sending pressure per length of time that is set based on the driving period of the liquid sending mechanism, and a trigger detection step of detecting a trigger of an occurrence of pulsation when a decrease range calculated in the pressure decrease calculation step exceeds a predetermined reference value, and is configured to execute a pulsation determination step after detecting the trigger in the trigger detection step. With such an aspect, even in a case where a fluctuation of liquid sending pressure in one driving period of the liquid sending mechanism cannot be read in detail, pulsation caused by entrapment of bubbles in the first plunger pump or the second plunger pump can be detected accurately. The fourth aspect can be freely combined with part or all of the above-mentioned first to third aspects.

In the fifth aspect of the embodiment of the liquid sending system according to the present invention, a period in which the liquid sending failure detector acquires a liquid sending pressure from the pressure sensor is variable.

REFERENCE SIGNS LIST

2 Liquid sending system
4 Sample injector
6 Separation column
8 Detector
10 Control device
12, 14 Plunger pumps
16 Pressure sensor
18, 20 Check valves
22 Liquid sending failure detector
24 Switch valve

The invention claimed is:

1. A liquid sending system for a liquid chromatograph comprising:
a liquid sending pump configured to consecutively send liquid using at least one plunger pump that sends liquid by reciprocally driving a plunger;
a pressure sensor for detecting a liquid sending pressure applied by the liquid sending pump; and
a liquid sending failure detector configured to acquire a liquid sending pressure detected by the pressure sensor periodically and detect a liquid sending failure of the liquid sending pump using the acquired liquid sending pressure by executing:
a pulsation detection step of:
obtaining a fluctuation range of the liquid sending pressure in a certain driving period of the liquid sending pump; and
detecting pulsation when the fluctuation range exceeds a predetermined reference value for a number of consecutive periods that exceeds a predetermined reference count; and
a liquid sending failure detection step of detecting a liquid sending failure of the liquid sending pump when the pulsation is detected in the pulsation detection step,
the liquid sending pump includes a first plunger pump and a second plunger pump that are driven complementarily, and
the liquid sending failure detector is configured to obtain a difference between the liquid sending pressures at a start point and an end point of a discharging operation of the first plunger pump as a first fluctuation value, obtain a difference between the liquid sending pressures at a start point and an end point of a discharging operation of the second plunger pump as a second fluctuation value, and obtain the fluctuation range using the first fluctuation value and the second fluctuation value.

2. The liquid sending system for a liquid chromatograph according to claim 1, wherein the liquid sending failure detector is configured to count only a period in which only one of the first fluctuation value and the second fluctuation value is a positive value as a period in which the fluctuation range exceeds a predetermined reference value, in the pulsation detection step.

3. The liquid sending system for a liquid chromatograph according to claim 1, wherein the reference count is variable.

4. A liquid sending system for a liquid chromatograph comprising:
a liquid sending pump configured to consecutively send liquid using at least one plunger pump that sends liquid by reciprocally driving a plunger;
a pressure sensor for detecting a liquid sending pressure applied by the liquid sending pump; and
a liquid sending failure detector configured to acquire a liquid sending pressure detected by the pressure sensor periodically and detect a liquid sending failure of the liquid sending mechanism using the acquired liquid sending pressure by executing:
a pulsation detection step of:
obtaining a fluctuation range of the liquid sending pressure in a certain driving period of the liquid sending mechanism; and
detecting pulsation when the fluctuation range exceeds a predetermined reference value for a number of consecutive periods that exceeds a predetermined reference count; and
a liquid sending failure detection step of detecting a liquid sending failure of the liquid sending pump when the pulsation is detected in the pulsation detection step, and
wherein the liquid sending failure detector is configured to execute a reference value determination step of determining the reference value by calculation based on at least the liquid sending pressure, before the pulsation detection step.

5. The liquid sending system for a liquid chromatograph according to claim 4, wherein a coefficient to be used for calculation of the reference value in the reference value determination step is variable.

6. The liquid sending system for a liquid chromatograph according to claim 1, wherein
the liquid sending failure detector, before the pulsation detection step,
is configured to execute:
a pressure decrease calculation step of calculating a decrease range of a liquid sending pressure per length of time that is set based on the driving period of the liquid sending pump; and
a trigger detection step of detecting a trigger of an occurrence of pulsation when a decrease range calculated in the pressure decrease calculation step exceeds a predetermined reference value, and
is configured to execute a pulsation determination step after detecting the trigger in the trigger detection step.

7. The liquid sending system for a liquid chromatograph according to claim 1, wherein a period in which the liquid sending failure detector acquires a liquid sending pressure from the pressure sensor is variable.

8. The liquid sending system for a liquid chromatograph according to claim 1, wherein the liquid sending failure detector obtains a fluctuation range of the liquid sending pressure with a period from a start point to an end point of a discharging operation of a plunger pump of the liquid sending pump as a certain driving period.

9. A liquid sending system for a liquid chromatograph comprising:
a liquid sending pump configured to consecutively send liquid using one plunger pump that sends liquid by reciprocally driving a plunger;
a pressure sensor for detecting a liquid sending pressure applied by the liquid sending pump; and
a liquid sending failure detector configured to acquire a liquid sending pressure detected by the pressure sensor periodically and detect a liquid sending failure of the liquid sending mechanism using the acquired liquid sending pressure by executing:
a pulsation detection step of:
obtaining a fluctuation range of the liquid sending pressure in a certain driving period of the liquid sending mechanism; and
detecting pulsation when the fluctuation range exceeds a predetermined reference value for a number of consecutive periods that exceeds a predetermined reference count; and
a liquid sending failure detection step of detecting a liquid sending failure of the liquid sending pump when the pulsation is detected in the pulsation detection step, and wherein the liquid sending failure detector obtains a fluctuation range of the liquid sending pressure with a period from a start point to an end point of a discharging operation of the one plunger pump of the liquid sending pump as a certain driving period.

* * * * *